Figure 1:
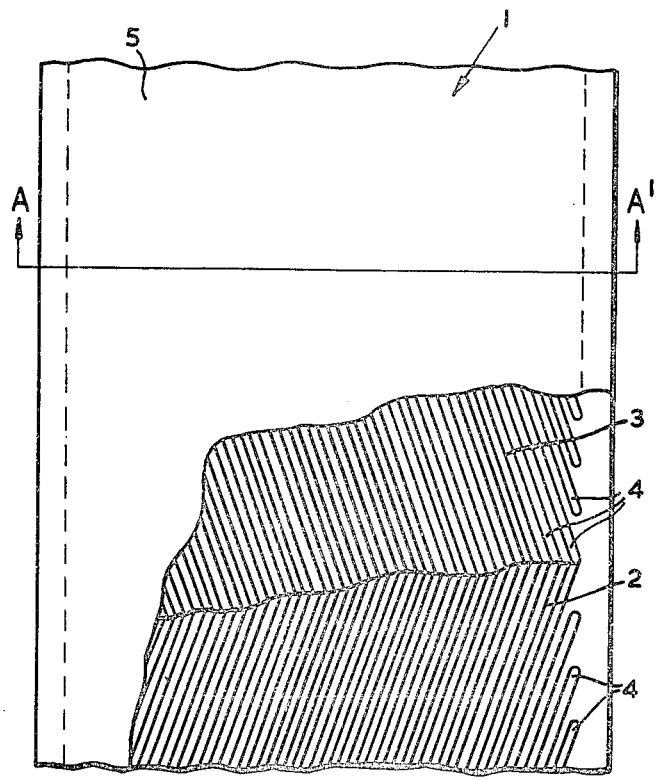

Oct. 19, 1965  B. H. BEEBEE  3,212,627
REINFORCED MECHANICAL BELTING
Filed Oct. 22, 1963  5 Sheets-Sheet 1

Inventor:
Brian Harry Beebee
by Benj. T. Rauber
attorney

Oct. 19, 1965     B. H. BEEBEE     3,212,627
REINFORCED MECHANICAL BELTING

Filed Oct. 22, 1963     5 Sheets-Sheet 2

Inventor:
Brian Harry Beebee
by Benj. T. Rauber
attorney

Oct. 19, 1965  B. H. BEEBEE  3,212,627
REINFORCED MECHANICAL BELTING
Filed Oct. 22, 1963  5 Sheets-Sheet 3
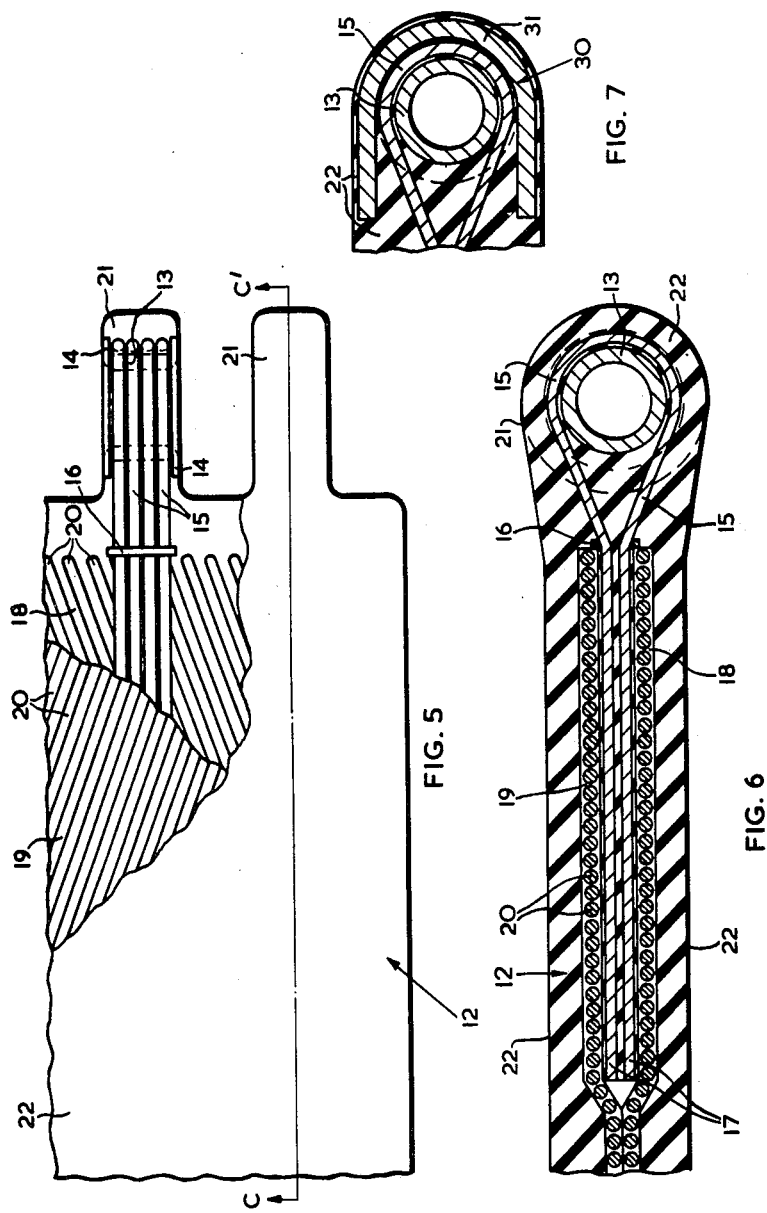
Inventor:
Brian Harry Beebee
by Benj. T. Pauba
attorney

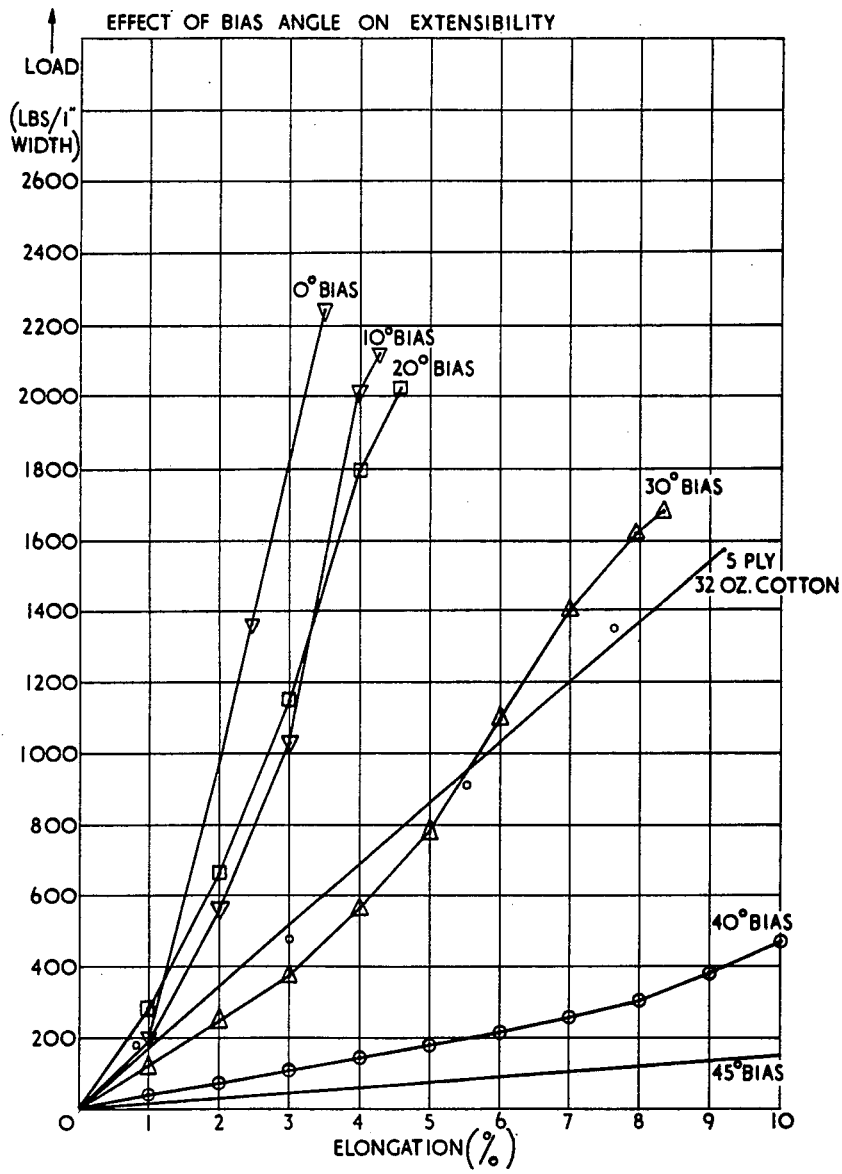

United States Patent Office 3,212,627
Patented Oct. 19, 1965

3,212,627
REINFORCED MECHANICAL BELTING
Brian Harry Beebee, Walsall, England, assignor to Dunlop Rubber Company Limited, London, England, a British company
Filed Oct. 22, 1963, Ser. No. 317,913
Claims priority, application Great Britain, Oct. 31, 1962, 41,109/62; Sept. 12, 1963, 35,914/63
9 Claims. (Cl. 198—193)

This invention relates to reinforced mechanical belting comprising a flexible composition such as rubber or polyvinyl chloride having a reinforcement of steel or the like substantially inextensible cords, and especially, to conveyor belting.

According to the invention reinforced mechanical belting comprises a reinforcement of substantially inextensible cords embedded in a flexible composition, said reinforcement comprising at least two reinforcement layers of cords in which the cords are arranged in substantially parallel side by side relationship, the cords in each layer being biased with respect to the longitudinal axis of the belting at an angle of up to 40°, and the bias angle of the cords of one layer being in the opposite sense to the bias angle of the cord in an adjacent layer.

According to the present invention also a segmental conveyor belt comprises a segment member or members comprising reinforced mechanical belting according to the immediately preceding paragraph, said segment member or members having castellated ends comprising ferrules each of which is enclosed by substantially inextensible cords the ends of which extend a short distance into the segment member and enclose or are enclosed by the ends of the reinforcement layers, said ferrules being arranged in transversely aligned relationship to receive a tie-bar and the castellations on one segment end to be connected being staggered with respect to the castellations on the other segment end to be connected so that the castellations on one end fit within the gaps between the castellations on the other end when the segments are connected, and a tire-bar to connect adjacent segment ends.

The substantially inextensible cords, such as steel cords, forming the reinforcement layers are preferably disposed at a bias angle with respect to the longitudinal axis of the segment member of from 5° to 40°, and preferably between 15° and 30°. The belting has at least two reinforcement layers and preferably has an even number of such layers, the bias angle of the cords in one layer being in the opposite sense to the bias angle of the cords in an adjacent layer, so that the cords in adjacent layers cross at an angle equal to the sum of the bias angles of the respective layers. Usually the belting has two reinforcement layers, and the bias angle is the same in each layer.

The sheets of cords forming the reinforcement layers may be made up of strips severed transversely from a length of longitudinally disposed cords, the angle of severance being the required bias angle except that it is with respect to the transverse axis of the length. Successive strips are arranged in the sheets with the cords in substantially side by side relationship.

The flexible composition in which the reinforcement is embedded, and which forms the working surfaces of the belting, can be a natural or synthetic rubber composition, or a synthetic resin composition such as a plasticized polyvinyl chloride composition.

Belting constructed in accordance with the invention can be made in segments which segments are connected to produce the belting. The segments must be provided with means for connecting adjacent ends, and this can be done by preparing the segments with castellated ends, i.e., each end is provided with a number of lugs, each castellation or lug comprising a rigid ferrule enclosed by substantially inextensible cords which are disposed parallel to the longitudinal axis of the segment member and which extend a short distance into the segment member. Preferably the ends of the cords enclosing the ferrules are enclosed by the ends of the reinforcement layers, and in such a case the ends of the reinforcement layers may be provided with a chafer strip. The chafer strip should preferably be of a material which can be easily bonded to the flexible composition and the chafer strip should be easily penetrated by the flexible composition. A suitable material for the chafer strip is an open-woven nylon fabric. The purpose of this chafer strip is to prevent movement of the cords which form the reinforcement layers, and of the cords enclosing the ferrule, due to flow of the flexible composition during the moulding operation to which the belt is submitted to cure the flexible composition.

The ferrules, which are enclosed by substantially inextensible cords, such as steel cords, to form the castellations preferably have external flanges at each end, and the substantially inextensible cords, which are arranged in side by side relationship and disposed parallel to the longitudinal axis of the segment member, enclose the ferrule between the flanges. In this manner, inadvertent transverse movement of the ferrules is prevented. The ferrule should be made of a rigid material and can be a metal ferrule such as a stainless steel ferrule or can be made of a rigid polymeric material.

The substantially inextensible cords, such as steel cords, enclosing each ferrule are preferably stronger than the substantially inextensible cords forming the reinforcement layers so that when adjacent segment ends are connected, the joint produced will have a strength at least equal to the strength of the segment member.

The substantially inextensible cords enclosing each ferrule are embedded in the flexible composition which forms the working surfaces of the segment member, so that each castellation has a covering of flexible composition. The flexible composition may engage directly around the substantially inextensible cords enclosing the ferrule, or a U-shaped insert may be interposed between the substantially inextensible cords and the flexible material, with the arms of the U-shaped insert projecting into the segment member and extending a short distance into the segment member. The insert should preferably be of width equal to the length of the ferrule so that the edges of the insert enclose the flanges at each end of the ferrule and in this way the substantially inextensible cords enclosing the ferrules are protected. The U-shaped insert should be of a rigid material and metal inserts, such as stainless steel inserts, are preferred, although inserts made of rigid polymers can be used.

The ferrules are arranged in aligned relationship transverse the segment member so that a tie-bar may be inserted through the ferrules. The ferrules should peferably be of equal length, and in such a case the gap between the ends of adjacent ferrules, i.e., the gap between adjacent castellations, is of a width slightly greater than the length of a ferrule so that the castellations on one segment end to be connected can fit within the gaps between the castellations on the other segment end to be connected.

The castellations on the ends of the segment member or members are of substantially the same length, which length is such that when adjacent segment ends are connected the ferrules on one end are in aligned relationship with the ferrules on the other end, so that a tie-bar may be inserted through the ferrules to connect said segment ends.

The tie-bar is preferably made of metal, and a suitable tie-bar is one made of cabled die-formed steel wires.

Figure 2:
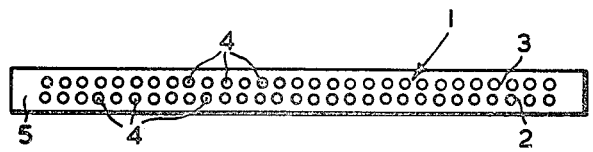
Figure 3:
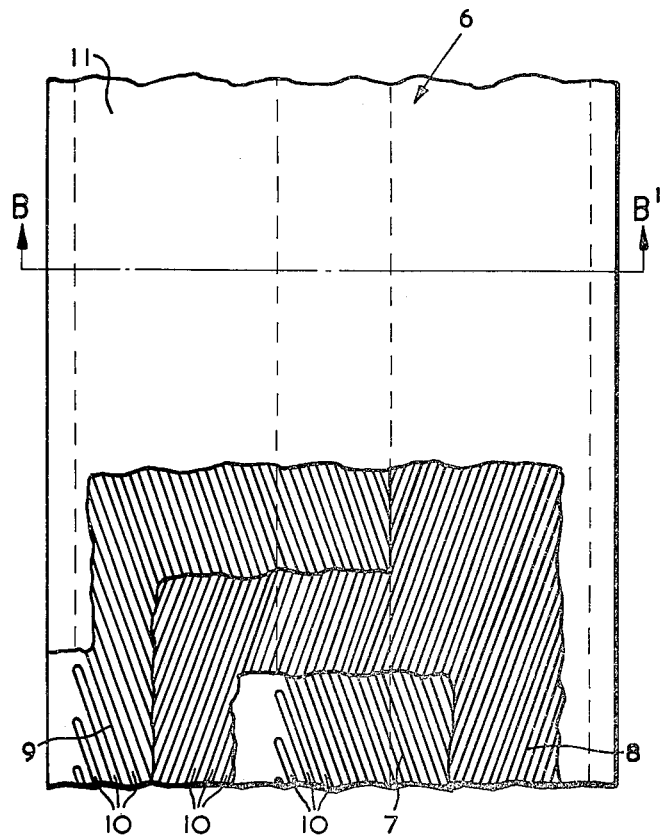
Figure 4:
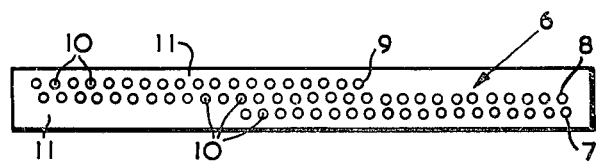
Figure 8:
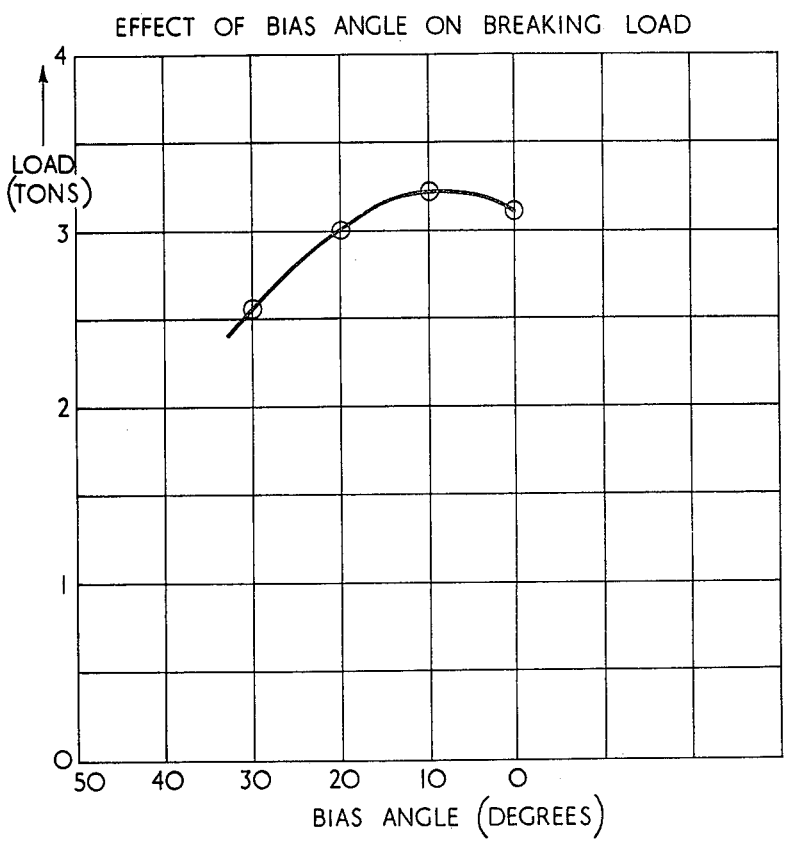

Several forms of reinforced mechanical belting constructed in accordance with the present invention will now be described by way of example only with reference to the accompanying drawings in which FIGURE 1 shows a plan view of a section of a belt with various components cut away to show the construction of the belt in detail, FIGURE 2 shows a cross-section through a belt taken along the line A—A$^1$ of FIGURE 1, FIGURE 3 shows a plan view of a section of an alternative form of belt with various components cut away to show the construction of the belt in detail, FIGURE 4 shows a cross-section through a belt taken along the line B—B$^1$ of FIGURE 3, FIGURE 5 shows a plan view of a segment end with various components cut away to show the construction of the segment in detail, FIGURE 6 shows a section through a segment end taken along the line C—C$^1$ of FIGURE 5, FIGURE 7 shows a section through a castellation illustrating an alternative construction to that shown in FIGURES 5 and 6, FIGURE 8 shows a graph illustrating the effect of the bias angle of the cords of a reinforcement layer on the breaking load of a belt, and FIGURE 9 shows a graph illustrating the effect of the bias angle of the cords of a reinforcement layer on the extensibility of a belt.

Referring to FIGURES 1 and 2, a belt 1 has a reinforcement consisting of two reinforcement layers 2 and 3 of rubber-coated steel cords 4, the cords in each layer being arranged in substantially parallel side by side relationship and biased with respect to the longitudinal axis of the belt at an angle of 15°. The cords of layer 2 are biased in the opposite sense to the cords of layer 3 so that the cords of layer 2 cross the cords of layer 3 at an angle of 30°. The reinforcement is embedded in a vulcanized rubber composition 5 which provides the working surfaces of the belt 1.

In the belting 6 shown in FIGURES 3 and 4 the reinforcement consists of three reinforcement layers 7, 8 and 9 of rubber-coated steel cords 10, the cords in each layer being arranged in substantially parallel side by side relationship and biased with respect to the longitudinal axis of the belt 6 at an angle of 15°. The reinforcement layers 7 and 9 are arranged one on each side of the layer 8, and have a width slightly greater than half the width of the layer 8. The layers 7 and 9 extend one from each edge of the layer 8 and the cords 10 of the layers 7 and 9 are biased in the opposite sense to the cords 10 of the layer 8, i.e., the cords of the layers 7 and 9 across the cords of the layer 8 at an angle of 30°. The reinforcement is embedded in a vulcanized rubber composition 11.

Using the components shown in FIGURE 4 it is to be understood that the layers 7 and 9 can if required be arranged both on one surface of the layer 8. In this case, the layers 7 and 9 again extend one from each edge of the layer 8, and the cords of these layers are biased in the opposite sense to the cords of the layer 8.

A segment member 12 constructed in accordance with the invention is illustrated in FIGURES 5 and 6. A flanged stainless steel ferrule 13 is enclosed between the flanges 14 by a strip of rubber-coated steel cords 15 which cords are arranged in side by side relationship and disposed parallel to the longitudinal axis of the segment member 12. A steel wire staple 16 holds together the ends of the strip 15 adjacent to where this strip engages the ferrule 13. The purpose of this staple 16 is merely to hold the strip 15 around the ferrule 13 during manufacture of the segment member 12. The ends 17 of the rubber-coated steel cords 15 extend a short distance into the segment member and are enclosed by the ends of two reinforcement layers 18 and 19 of rubber-coated steel cords 20 which cords are arranged in side by side relationship and biased with respect to the longitudinal axis of the segment member 12 at an angle of 15°. The bias angle of the cords of the layer 18 is in the opposite sense to the bias angle of the cords of the layer 19 so that the cords of the layer 18 cross the cords of the layer 19 at an angle of 30°. The reinforcement, including the castellations 21 has a covering of a vulcanized rubber composition 22 which provides the working surfaces of the segment member 12. The castellations 21 on the ends of the segment member 12 are of substantially the same size, and the gap between adjacent castellations is slightly wider than the width of a castellation, i.e., the gap is of a width slightly greater than the length of a ferrule 13. The castellations 21 on one end of the segment member are arranged in staggered relationship with respect to the castellations on the other end of the segment member. The segment member 12 is slightly thicker at the castellations 21 than at the centre, e.g., ⅛″ thicker at the castellations in a ½″ thick segment member, and the ends of the segment member 12 are shaped for a short distance to allow for this.

A segmental conveyor belt constructed in accordance with the invention comprises a number of segment members as shown in FIGURES 5 and 6, adjacent segment ends being connected by means of a cabled, die-formed steel tie-bar. Adjacent segment members are arranged so that the castellations on one segment end to be connected are staggered with respect to, and fit within the gaps between the castellations on the adjacent segment end to be connected.

In manufacturing a conveyor belt as described above and shown in FIGURES 5 and 6 of the accompanying drawing, a flanged stainless steel ferrule 13 is enclosed, between the flanges 14, by a strip of rubber-coated steel cords 15 (4 ends of 21 x 0.0058″ steel wire arranged in side by side relationship and cold calendered with a natural rubber/cobalt linoleate compound). A steel wire staple 16 is looped around the strips of cords 15 adjacent the ferrule 13 to hold said strips around the ferrule 13. A number of such assemblies are made.

Two reinforcement layers 18 and 19 of rubber-coated steel cords 20 (9 x 0.0058″ zinc plated steel wire, the cords being arranged in side by side relationship and cold calendered with a natural rubber/cobalt linoleate compound) in which the cords are biased with respect to the longitudinal axis of the segment member at an angle of 15° are laid one upon the other in such a way that the cords of the layer 18 cross the cords of the layer 19 at an angle of 30°. The ends of the rubber-coated steel cords enclosing a ferrule are placed between the ends of the reinforcement layers 18 and 19 with the ferrule 13 and a short length of rubber-coated steel cords projecting from the end of the reinforcement layers to form a castellation 21. This procedure is repeated to produce a number of castellations extending from each end of the reinforcement layers, the castellations being of substantially the same length and spaced apart at a distance slightly greater than the width of a castellation, and the castellations on one end being staggered with respect to the castellations on the other end. The reinforcement layers are then pressed together.

The assembly, including the castellations is covered with sheets of a vulcanizable rubber composition 22 of width slightly greater than the width of the reinforcement layers, and the covered assembly is then moulded under heat and pressure to vulcanize the rubber composition 22, mould inserts being used to produce the gaps between castellations, and to produce slightly shaped ends to the segment member so that the thickness at the castellations is slightly greater than the thickness at the centre of the segment member.

Adjacent segment members are connected by laying two segment members end to end so that the castellations on one end to be connected are staggered with respect to, and fit within the gaps between, the castellations on the other end to be connected, and inserting a cabled die-formed steel tie-bar of length equal to the width of a segment member through the aligned ferrules.

FIGURE 7 shows a section through a castellation similar to that shown in FIGURE 6. In FIGURE 7, the castellation 30 is shown with a U-shaped steel insert 31 protecting the steel cords 15 where these enclose the stainless steel ferrule 13. The width of this insert 31 is substantially equal to the length of a ferrule so that the edges of the insert 31 engage the flanges 14 on the ends of the ferrule 13.

In the belting according to the present invention and described above with reference to FIGURES 1 to 7 of the accompanying drawings, the reinforcement layers comprise substantially inextensible cords such as steel cords, which cords are biased with respect to the longitudinal axis of the belt at an angle of up to 40°. The bias angle of these cords determines the extensibility of the resultant belt and also the load at which the belt breaks. This is illustrated in FIGURES 8 and 9 of the accompanying drawings.

FIGURE 8 shows the effect of the bias angle of the cords forming the reinforcement layers on the breaking load of the belt. The graph was obtained from measurements obtained using a belt consisting of a reinforcement embedded in a vulcanized rubber composition. The reinforcement was two layers of steel cords having 18 ends per inch of 9 strand (3 x 3 x 0.0058") steel cord, the cords of these layers being biased with respect to the longitudinal axis of the belt, and the cords of one layer being biased in the opposite sense to the cords of the other layer. The sample used was 3½ inches wide and ½ inch thick.

FIGURE 9 shows the effect of the bias angle of the cords forming the reinforcement layers on the extensibility of the belt. Measurements were obtained using a belt as described in the immediately-preceding paragraph.

Belts constructed in accordance with the present invention have improved properties over belts in which the reinforcement cords are disposed parallel to the longitudinal axis of the belt.

In an example steel cords made up of 9 strands of 0.0058 inch diameter steel wire, 3 strands being twisted into a bunch and 3 bunches being cabled into the cord, were employed in two layers each having 18 ends per inch embedded in a vulcanized rubber composition. The cords were in substantially parallel side by side relationship in each layer and each layer was biased at 15 degrees with respect to the longitudinal axis of the belting so that the cords in one layer were disposed at an angle of 30 degrees with respect to the cords in the other layer. The belting was made with castellated ends having transversely aligned apertures in the castellations for connection to an adjacent segment of belting by a tie-bar in known manner.

For purposes of comparison belting made up of a number of the castellated segments was tested on a dynamometer together with conventional belting made up of segments reinforced with cords of 12 strand 0.0058 inch diameter wire at a density of 13 ends per inch and a bias angle of 0 degrees, i.e., the cords were disposed longitudinally of the belting. 0.1562 inch diameter cabled steel tie bars were employed in the case of each belt.

The belts were run at 1,200 feet per minute under a loading of 600 pounds, the normal working tension for this type of belt in service.

The conventional belt was removed from the dynamometer after 5 minutes due to failure of the tie bars whereas the belt made according to the invention had sustained no damage after a further 40 minutes.

The loading was then increased to 1,500 pounds, i.e., 150 percent overload and the belt run at 1,200 feet per minute. The belt was removed for inspection after 30 minutes and was not subsequently replaced on the dynamometer since some damage was observed in the tie-bars.

A sample of belting according to the invention made as described above but with the cords at a bias angle of 30 degrees showed similar elongations under normal working load as belting reinforced with 5 plies of cotton yarn. The elongation when the bias angle was 20 and 10 degrees respectively was less, and that corresponding to a bias angle of 40 degrees was very considerably greater.

Having now described my invention, what I claim is:

1. A reinforced mechanical belting segment which comprises a reinforcement of substantially inextensible cords embedded in a flexible composition, said reinforcement comprising an even number of reinforcement layers of cords in which the cords are arranged in substantially parallel side-by-side relationship, the cords in each layer being biased with respect to the longitudinal axis of the belting at an angle of from 15° to 30° and the bias angle of the cords in one layer being in the opposite sense to the bias angle of the cords in an adjacent layer, strips of cords at each end of said segment in side-by-side position bent in a U-shape and extending from the bight of the U-shape parallel to the longitudinal axis of the belting into interleaved arrangement with said reinforcement layers, said strips being spaced transversely to provide spaces therebetween equal to the width of said strips, the strips at one end of the segment being displaced laterally from the strips of the other end of the segment to alignment with the spaces between the strips at the opposite end, metal ferrules one in each bight of said strips on a common axis and a layer of elastomeric composition covering and embedding said reinforcement and said strips in a unitary structure and providing castellated ends of said segments, the castellations of one end positioned to fit into the spaces between castellations of the opposite end.

2. Reinforced mechanical belting segment according to claim 1 in which the substantially inextensible cords are steel cords.

3. A conveyor belt comprising a series of segments each segment comprising a reinforcement of substantially inextensible cords embedded in a flexible composition, said reinforcement comprising an even number of reinforcement layers of cords in which the cords are arranged in substantially parallel side-by-side relationship, the cords in each layer being biased with respect to the longitudinal axis of the belting at an angle of from 15° to 30° and the bias angle of the cords in one layer being in the opposite sense to the bias angle of the cords in an adjacent layer, strips of cords at each end of said segment in side-by-side position bent in a U-shape and extending from the bight of the U-shape parallel to the longitudinal axis of the belting into interleaved arrangement with said reinforcement layers, said strips being spaced transversely to provide spaces therebetween equal to the width of said strips, the strips at one end of the segment being displaced laterally from the strips at the other end of the segment to alignment with the spaces between the strips at the opposite end, metal ferrules one in each bight of said strips on a common axis, a layer of elastomeric composition covering and embedding said reinforcement and said strips in a unitary structure and providing castellated ends of said segments, the castellations of one end positioned to fit into the spaces between castellations of the opposite end, the castellations of one segment fitting into the spaces between the castellations of an adjacent segment and a tie bar of cables extending through said ferrules.

4. A segmental conveyor belt according to claim 3 in which the tie bar comprises cabled steel wires die-formed to a tie bar.

5. A segmental conveyor belt according to claim 3 in which the substantially inextensible cords enclosing the ferrules are stronger than the substantially inextensible cords forming the reinforcement layers.

6. A segmental conveyor belt according to claim 3 in which said ferrules are externally flanged at each end and the U-shaped strips which enclose the ferrule engage the ferrule between the flanges.

7. A segmental conveyor belt according to claim 6 in which a U-shaped insert of width substantially equal to the length of a ferrule is interposed between the flexible covering material and the U-shaped strips which enclose a ferrule.

8. A segmental conveyor belt according to claim 3 in which the ends of the reinforcement layers are enclosed by a strip of open-woven nylon fabric.

9. A segmental conveyor belt according to claim 3 in which the ends of said segment member or members are shaped to produce a thickness at the castellations which is slightly greater than the thickness at the centre of the segment member.

References Cited by the Examiner
UNITED STATES PATENTS

| | | | |
|---|---|---|---|
| 1,612,024 | 12/26 | Jacobs | 198—193 X |
| 2,930,478 | 3/60 | Ruffino | 198—193 X |
| 3,036,944 | 5/62 | White | 74—232 |

FOREIGN PATENTS

| | | |
|---|---|---|
| 1,211,432 | 7/58 | France. |
| 1,087,849 | 8/60 | Germany. |

SAMUEL F. COLEMAN, *Primary Examiner.*
EDWARD A. SROKA, *Examiner.*